US012656616B2

(12) United States Patent
Kwitek

(10) Patent No.: US 12,656,616 B2
(45) Date of Patent: Jun. 16, 2026

(54) REFLECTIVE HEADSET WITH CROPPED COLLECTOR MIRROR

(71) Applicant: Spec3, Inc., Wilmington, DE (US)

(72) Inventor: Kenneth Kwitek, Reno, NV (US)

(73) Assignee: Spec3, Inc., Wilmington, DE (US)

( * ) Notice: Subject to any disclaimer, the term of this patent is extended or adjusted under 35 U.S.C. 154(b) by 0 days.

(21) Appl. No.: 18/658,038

(22) Filed: May 8, 2024

(65) Prior Publication Data

US 2025/0347912 A1     Nov. 13, 2025

(51) Int. Cl.
*G02B 27/01* (2006.01)
*G02B 27/09* (2006.01)

(52) U.S. Cl.
CPC ..... *G02B 27/0172* (2013.01); *G02B 27/0176* (2013.01); *G02B 27/0977* (2013.01); *G02B 2027/0169* (2013.01); *G02B 2027/0178* (2013.01)

(58) Field of Classification Search
CPC ................ G02B 27/01; G02B 27/0101; G02B 27/0103; G02B 27/0149; G02B 27/017; G02B 27/0176; G02B 27/0172; G02B 27/0179; G02B 27/0189; G02B 2027/0105; G02B 2027/0107; G02B 2027/0109; G02B 2027/011; G02B 2027/0114; G02B 2027/0112; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G02B 3/14
USPC ......................................................... 359/630
See application file for complete search history.

(56) References Cited

U.S. PATENT DOCUMENTS

| | | | |
|---|---|---|---|
| 9,151,954 B2 | 10/2015 | Magyari et al. | |
| 9,250,444 B2 | 2/2016 | Magyari | |
| 9,268,139 B2 | 2/2016 | Magyari | |
| 10,078,223 B2 * | 9/2018 | Magyari ........... | G02B 17/0642 |

(Continued)

*Primary Examiner* — Henry Duong

(57) ABSTRACT

A device in which one or more reflective collector elements receive image data from one or more light-emitting visual sources to be transmitted to an eyebox, which together form elements of a head mounted display ("HMD") useful for augmented reality ("AR") or virtual reality ("VR") applications, and where the one or more reflective collector elements are cropped to receive a portion of the image data from the one or more light-emitting visual sources, such that the etendue product at the one or more reflective collector elements is about the same as the etendue product within the eyebox.

9 Claims, 7 Drawing Sheets

(56) References Cited

U.S. PATENT DOCUMENTS

| | | | | |
|---|---|---|---|---|
| 11,187,908 | B2 | 11/2021 | Magyari | |
| 12,044,857 | B2 | 7/2024 | Magyari | |
| 2024/0061256 | A1* | 2/2024 | Ikeda | ..................... G02B 27/01 |

* cited by examiner

REFLECTIVE HEADSET WITH CROPPED COLLECTOR MIRROR

TECHNICAL FIELD

The present disclosure relates to an augmented reality or virtual reality headset and associated elements and components.

BACKGROUND

In the field of augmented reality ("AR") or virtual reality ("VR"), head mounted display ("HMD") devices are used for presenting image data to a user. Generally, an HMD comprises one or more image sources in the form of a micro-display, laser projector or other means; display optics, such as refractive, reflective or diffractive optics; means to attach the device to the user's head (for example, physical straps, arms, and caps) and components that allow it to be adjusted to a user's preferences, such as a diopter adjuster or an inter-pupillary distance ("IPD") adjuster, as well as associated circuitry. An HMD may be monocular (displaying information to a single eye) or binocular (displaying information to two eyes), depending on the commercial need and application.

Preferably, HMDs present image data to the user in a way that is immersive, such that the user can accept the presented image data as easily as the user accepts the real-world environment. The quality of immersion depends on several factors, including but not limited to the quality of image data provided to the user and the effective field of view ("FOV") perceived by the user. In addition, the level of immersion depends on physical factors, such as the HMD's form factor; temperature; weight; and steadiness, which can contribute to or detract from the level of immersion experienced by the user. In the case of AR applications, immersion also depends on the HMD's ability to present the image data in a manner that is seamless to the stimuli perceived by the user simultaneously from the real world.

The display optics in HMD devices may be reflective, refractive, or both. In the case of HMDs with refractive optics, the image data is transmitted through one or more optical element lens element media, which attenuates the signal and promotes distortion on the periphery of the lens element. HMDs with reflective optics, such as those in the HMD described in U.S. Pat. No. 9,250,444, the disclosure of which is expressly incorporated by reference here, perform better in these areas, but require a comparably larger form factor due to the larger surface area of the reflective collector elements. These reflective collector elements, which serve a function of collecting and magnifying the light output from the HMD light-emitting visual source, must be positioned on or near the face of the user, which tends to decrease immersion, as the larger size makes the user aware of the physical presence of the HMD. Moreover, as the market for HMD develops, consumers are demanding reduced form factor in eyeglass- or sunglass-style HMDs. Thus, despite the superior optical properties of reflective optical elements, so far, the commercial market has been dominated by refractive systems, in part because the larger form factor of currently available reflective HMDs does not meet the physical design constraints of eyeglass- or sunglass-style HMDs.

Thus, there is a need to reduce the form factor of the reflective optical system, to provide an ergonomic, easy-to-wear, and immersive HMD that benefits from the superior optical characteristics of reflective optical elements while maintaining a minimum form factor.

Etendue as a Measure of Randomness of an Optical Path

Etendue is a property of light in an optical system, characterized by the area of the source aperture times the angle from the source aperture to the periphery of the pupil entrance. In the case of an HMD, the relevant etendue observed in the system is the etendue observed at the eyebox. Etendue is a measure of how dispersed light appears as compared to the original source, and can be analogized to the increase in randomness, or entropy, that light undergoes as it is observed farther and farther away from the aperture. As one observes a source aperture farther and farther away, the image quality is adversely affected: the image expands proportional to the square of distance, causing a reduction in brightness per viewable area; the perceived brightness across the entire display becomes inconsistent, as the image in the center tends to become brighter and the edges tend to become dimmer; and further, as points of image data within the aperture source interfere with others (e.g., pixel-pixel interference), the image data itself can lose fidelity and appear fuzzy or blurry.

Lambertian Emitter

Under Lambert's cosine law, the observed brightness (I) of a planar light source is directly proportional to the cosine of the angle $\theta$ between the direction of the incident light to the observer and the surface normal according to Equation 1 below:

$$I = I_0 \cos(\theta) \qquad \text{Equation 1}$$

Thus, an observer directly in front of the light source (i.e., where $\theta=0$) would observe the peak brightness from the light source ($I_0$), whereas an observer exactly at the side (i.e., where $\theta=\pi/2$) would observe no light; and observers in between would observe some level of brightness defined by the function above.

SUMMARY

Although it is conventional wisdom to preserve all light emitted from the light-emitting visual source in an HMD to maximize brightness and image quality, it has been found that in the case of HMDs with reflective optical elements, certain portions of the image source can be removed by cropping the periphery of the reflective collector element to intentionally eliminate some of the transmitted light from the light-emitting visual source. Due to the superior brightness transmission capability of reflective optical elements compared to refractive optical elements, the brightness is maintained at levels equal or superior to traditional refractive HMDs. As a result, the present disclosure provides a design for an HMD with reflective optical elements that is both of minimal form factor and capable of superior clarity, brightness and other optical properties when compared to refractive lens elements.

Etendue will always increase in an optical system, but under certain conditions, portions of the image source around the periphery of the image can be discarded, which can artificially reduce etendue by creating a smaller effective aperture. This approach has not been followed in HMDs to date, in part because discarding light from the source causes significant loss of brightness.

Using the design methodology of the present invention, the etendue perceived at the primary collecting mirror can be matched with the etendue perceived at the eyebox. By matching the etendue at both points, the image presented to the user will benefit from reduced pixel-pixel interference and will appear sharper and better defined.

The present disclosure thus provides a miniaturized, head-mounted display with reflective elements that has a reduced form factor due to a cropped reflective collector element that selectively discards unneeded light such that the etendue at the primary lens element is about the same as the etendue at the eyebox of the HMD.

In one embodiment, an HMD apparatus with reflective optical elements is provided. The HMD apparatus includes a reflective optical element assembly including a light-emitting visual source and a plurality of reflective optical elements. This plurality of reflective optical elements comprises at least one reflective collector element, as well as one or more additional reflective optical elements that transmit the light from the light-emitting visual source to the pupil of a user. The reflective collector element is positioned in front of the light-emitting visual source such that it receives the visual image data and forwards it to the one or more additional reflective optical elements that transmit said data to the user. The reflective collector element has a size that intentionally does not capture all the light emitted from the light-emitting visual source.

In one embodiment, the reflective collector element has a width chosen such that the etendue at the reflective collector element, when compared to the aperture of the light-emitting visual source, is about the same as the etendue at the eyebox, when compared to the aperture of the light-emitting visual source. As a result, a portion of the emitted light from the light-emitting visual source is discarded by choosing a reflective collector element size that is smaller than that required to capture all emitted light. The reflective collector element reflects the remaining portion of the visual image data light from the image source to the first of the one or more additional reflective optical elements, which proceeds to transmit the visual image data to the other additional reflective optical elements, as applicable, and ultimately into the eyebox.

DETAILED DESCRIPTION

In one embodiment of an HMD comprising reflective optical elements, light from a light-emitting visual source is intentionally discarded by reducing the width of the reflective collector element such that the etendue at the reflective collector element is about the same as the etendue perceived at the eyebox.

Figure 1:
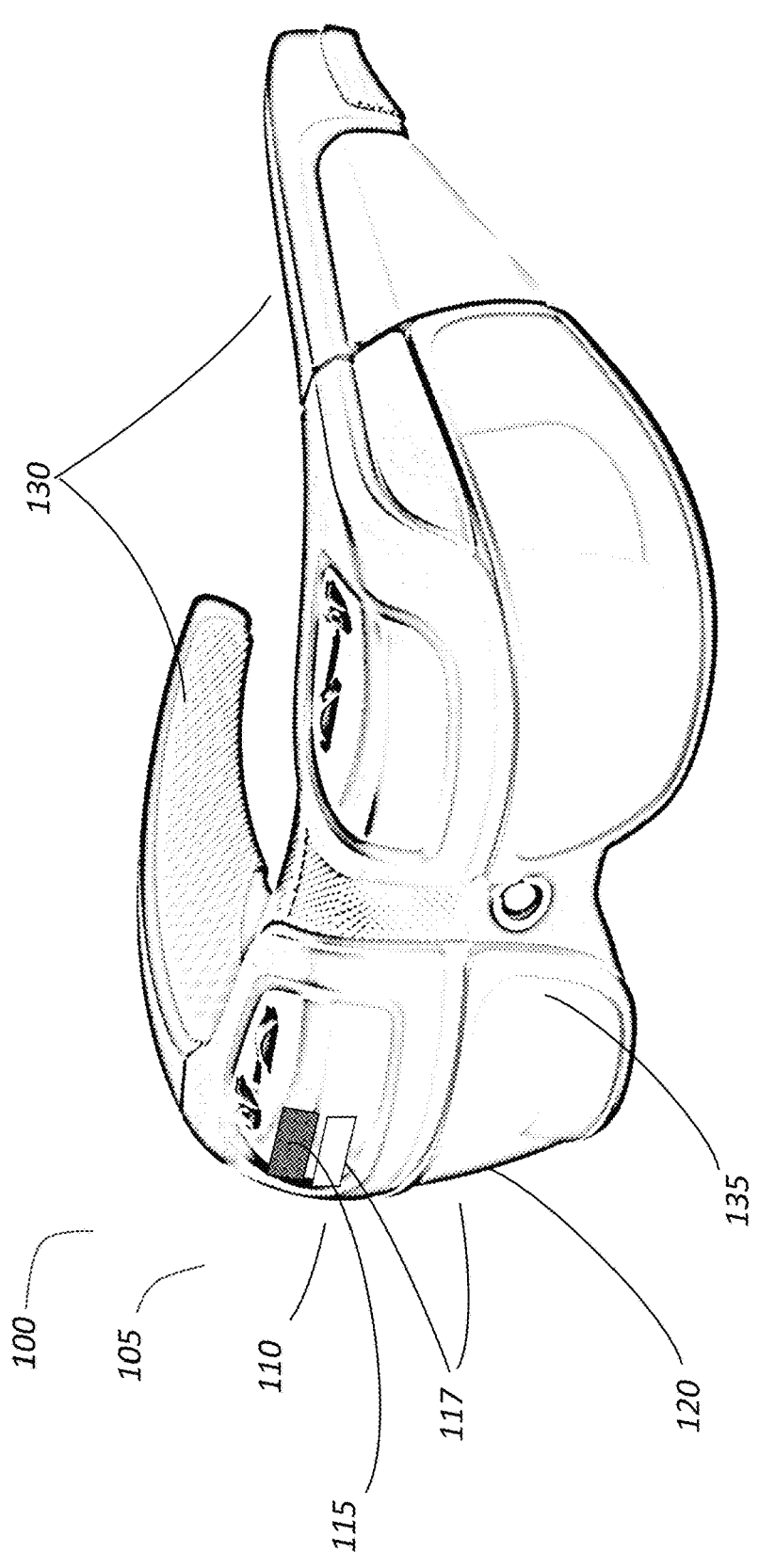
FIG. 1 is an illustration of an embodiment of the invention.

FIG. 1 shows an illustration of an HMD device 100. The device includes a frame 105 with a reflective collector element 110, light-emitting visual source 115, and additional reflective optical elements 117. The device optionally has additional refractive optical elements (not shown) in the optical path (defined as the path that the light from the light-emitting visual source follows to arrive at the eyebox) to further focus or process the image present the light from the light-emitting visual source to the user. An image is presented to the user at display area 120. The frame 105 is supported on the viewer's head with arms 130. The frame 105 and arms 130 contain associated circuitry, including a driver board to drive the displays as well as supporting electronics, which include batteries, microprocessors, and/or wireless connection(s) to sources of electronic data that contains visual image data. A camera or cameras 135 can be included to capture live video of the user's surroundings. The locations of the various components in the HMD device 100 are shown as an example, other locations are possible and within the scope of the abilities of one of ordinary skill in the art.

A wide variety of HMD devices 100 are known in the art, including monoscopic devices which presents the same image information is presented to both eyes; and stereoscopic devices which presents different image information to each eye. In some applications, the stereoscopic devices may present slightly different versions of the same different image sources with different images being presented to the user's eyes wherein the different images have different perspectives of the same scene to create a sense of depth.

A variety of image sources to provide images for display are known in the art including, for example, organic light-emitting diode (OLED) displays, quantum dot based light emitting diodes (QLED) displays, liquid crystal displays (LCDs), liquid crystal on silicon (LCOS) displays, e-ink displays, micro LED displays, or multicolor LED displays. In addition, the image sources can be microprojectors, laser-writers or holographic displays.

The optics associated with the image sources relay the image light from the image sources to the display area 120. The optics comprises reflective optics, and optionally additional refractive lenses, or diffractive lenses. In the case of AR HMDs, display area 120 comprises a partially reflective optical element that allows the user to perceive both the data from the light-emitting visual source as well as the real-world environment directly in front of the user. The partially reflective mirror can be any type of reflecting mirror surface that also allows some portion of the incident light to be transmitted.

In certain HMDs with reflective collector elements such as reflective collector element 110 in FIG. 1, it is desirable to reduce the weight, size and form factor of the HMD such that the presence of the HMD itself is less noticeable by the user. This disclosure provides an HMD with a reflective collector element of a reduced size and form factor without sacrificing image quality perceived by the user.

Figure 2:
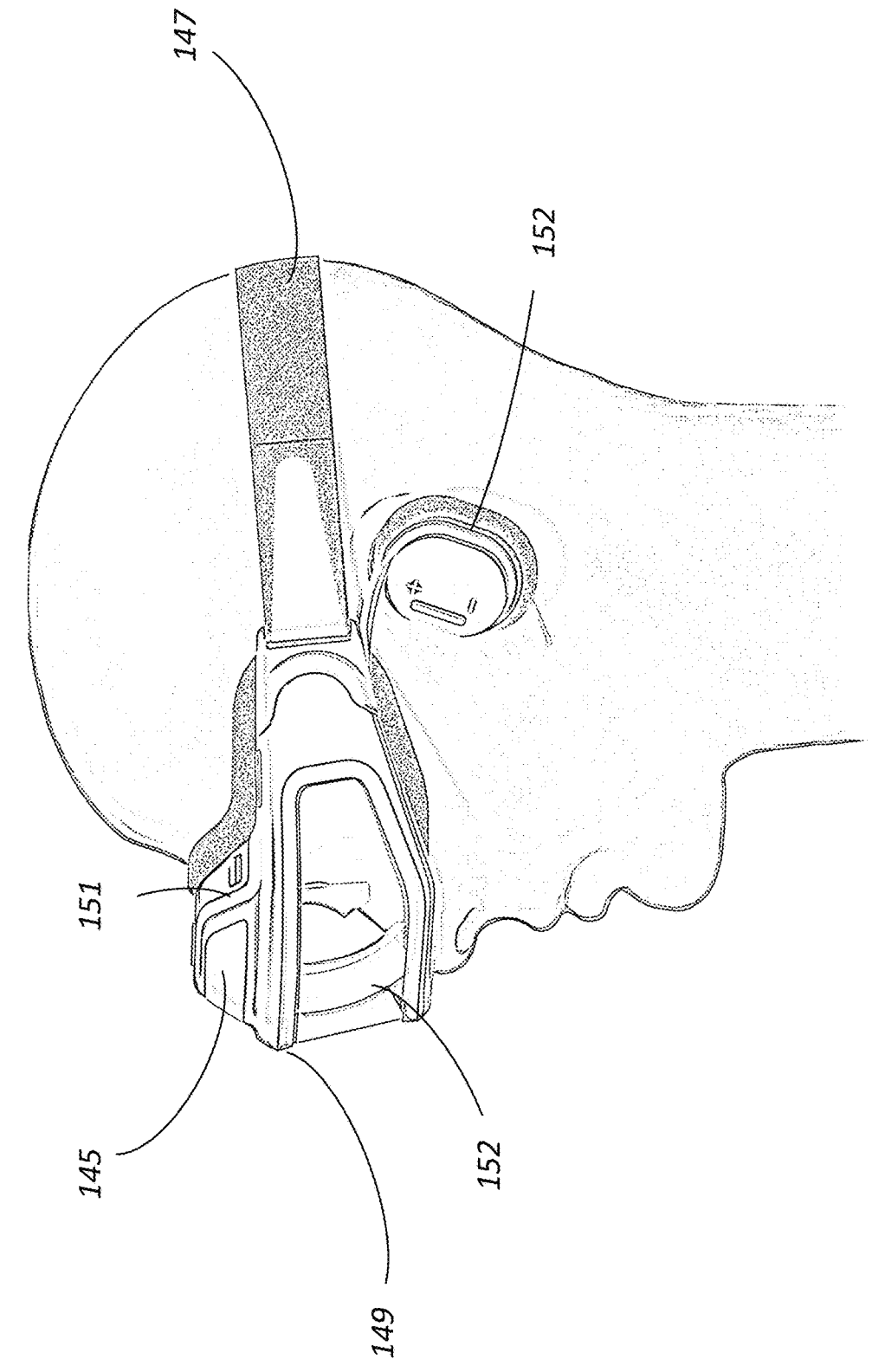
FIG. 2 is an illustration of an embodiment of the invention.

FIG. 2 provides another example of an HMD that includes reflective collector elements with a size that meets these constraints. Referring to FIG. 2, reflective collector element 145 has a size that transmits a portion of the emitted light to the additional reflective optical elements along the optical path to the eyebox. Strap 147 supports frame 149 and housing 151, which contains a microdisplay, associated supporting circuitry, and additional optical elements (not shown). An image is presented to the user at display area 151. Audio information is presented to the user in earpiece 152.

Figure 3:
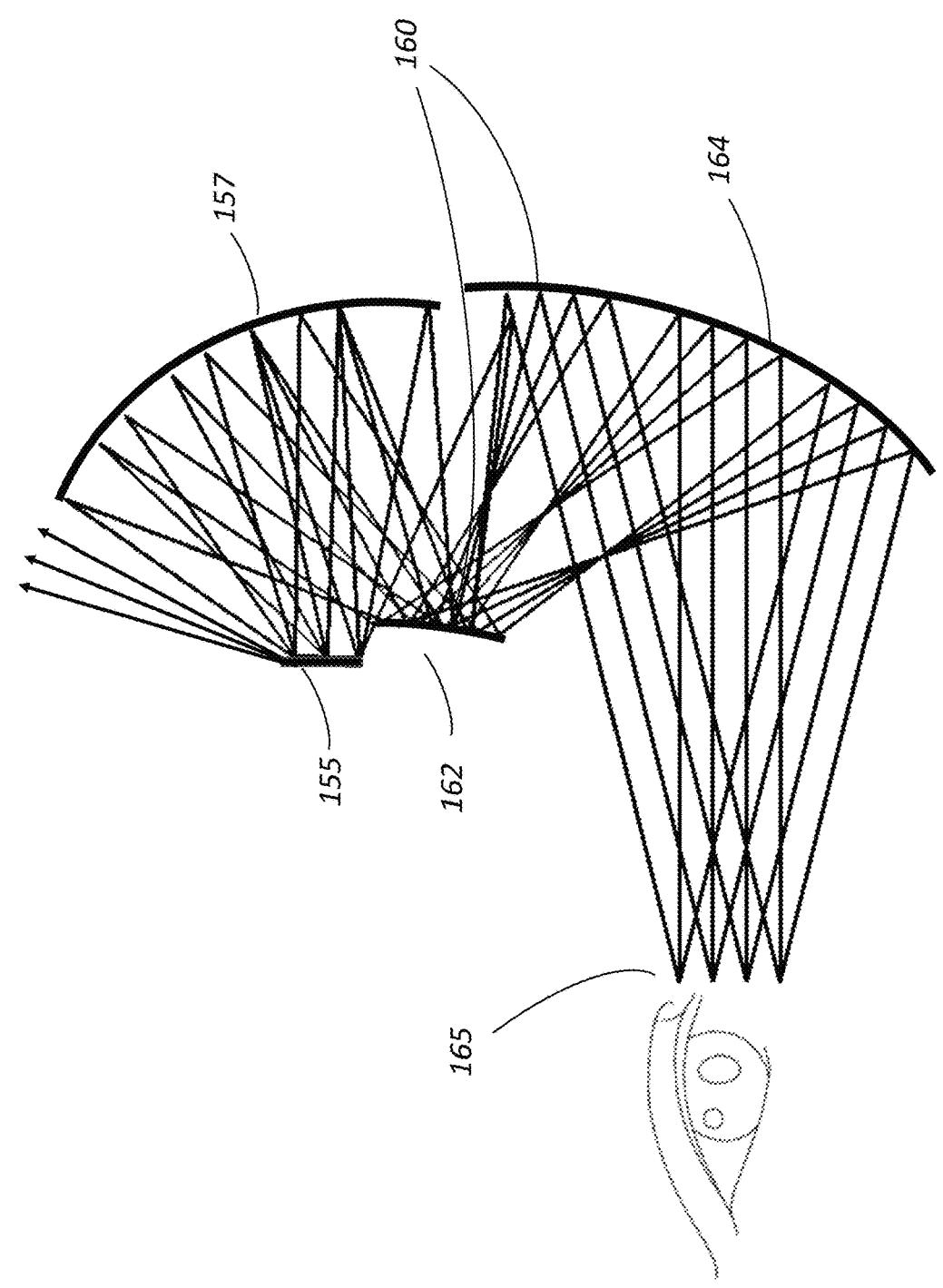
FIG. 3 is an illustration of the optical path in an embodiment of the invention.

Turning first to FIG. 3, the optics associated with the HMD in this example will be described. In this embodiment, the light-emitting visual source 155 is an OLED microdisplay, such as the Sony ECX335AF-6, ECX335BG or ECX335SN-6. The reflective collector element 157 is placed in front of the light-emitting visual source 155 (i.e., in this embodiment, farther away from the user's face in the direction of the view of the user) so that a portion light emitted by the light-emitting visual source 155 is captured by the reflective collector element. The reflective collector element 157 is comprised of a reflective medium, such as glass, metallic or polymer with one or more coatings applied, and has a surface curvature that reflects and pref- erably magnifies the image to one or more additional reflec- tive optical elements 160. The surface curvature of the reflective collector element may be defined by one or more polynomial equations or may be free form. The additional reflective optical elements 160, alone or in combination with one or more additional refractive or diffractive lens ele- ments, are configured to reflect and transmit the light from the reflective collector element to the eyebox 165. In the embodiment of FIG. 3, the additional reflective optical elements comprise relay element 162 and combiner element 164.

In the embodiment of FIG. 3, the reflective collector element 157 is smaller than what is necessary to reflect all the light emitted from the light-emitting visual source 155. Specifically, the width of the reflective collector element 157 in the example of FIG. 3, where "width" refers to the linear dimension parallel to the part of the light-emitting visual source that traverses roughly along a user's chin to his forehead, is cropped such that the etendue at the reflective collector element 157 is about the same as the etendue observed art the eyebox 165. This allows the HMD to have the reduced form factor shown in FIG. 2 without sacrificing image quality.

A method of calculating etendue is provided. Etendue can be calculated using the following Equation 2:

$$E = 2 \cdot d \cdot n \cdot \sin(\theta) \qquad \text{Equation 2}$$

Where E is the etendue product; dis the size of the source aperture; n is the refractive index of the system; and θ is the angle between a vector extending from the center of the aperture along the normal horizontal axis and a vector extending from the center of the aperture to the periphery of the optical system.

Figure 4:
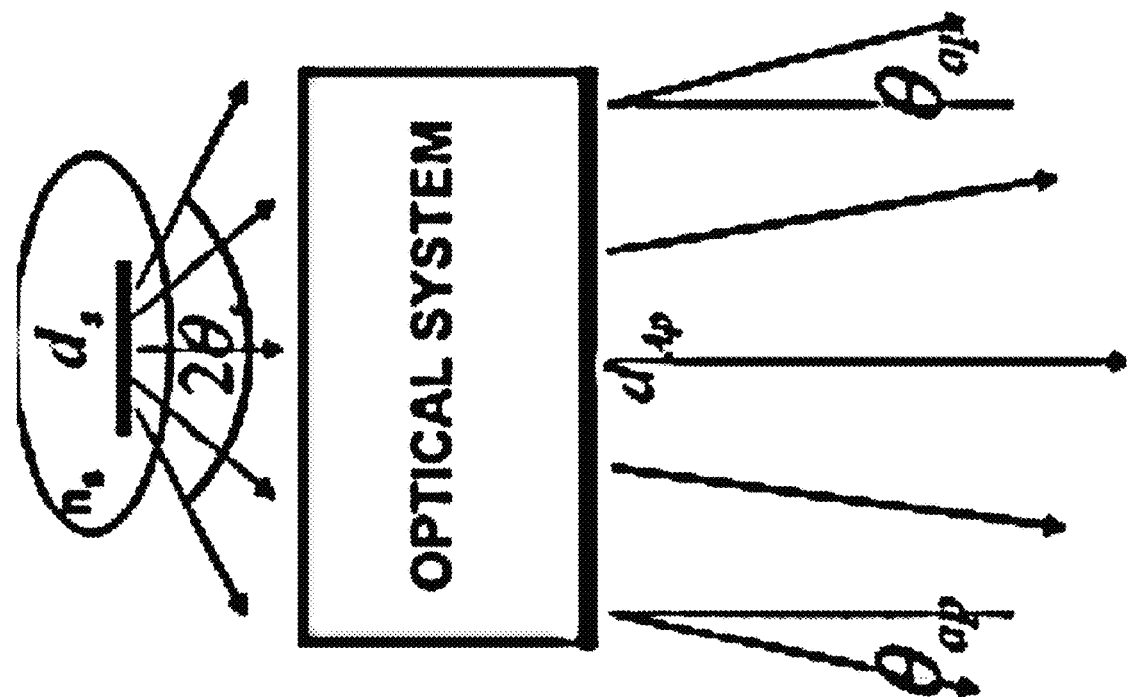
FIG. 4 is an illustration of a methodology of computing an etendue product.

With reference to FIG. 4, in an optical system such as that present in an HMD with a reflective collector element, etendue can be evaluated at both the beginning of the optical system (e.g., at the reflective collector element) and at the observing aperture (e.g., the eyebox), using the following Equations 3 and 4:

$$E_s = 2 \cdot d_s \cdot n_s \cdot \sin(\theta_s) \qquad \text{Equation 3}$$

(etendue at the reflective collector element)

$$E_{Ap} = 2 \cdot d_{Ap} \cdot N_{Ap} \cdot \sin(\theta_{Ap}) \qquad \text{Equation 4}$$

(etendue at the eyebox)

The optimal size for the reflective collector element can be calculated by equilibrating the etendue at the reflective collector element with the etendue at the eyebox, i.e., by setting these two equations equal to one another as in Equation 5. In a reflective HMD, the refractive indices $n_s$ and $n_{Ap}$ can be assumed to be the same, since in reflective systems the refractive index is that of ambient air (approxi- mately 1). Thus, $$d_s \cdot \sin(\theta_s) = d_{Ap} \cdot \sin(\theta_{Ap}) \qquad \text{Equation 5}$$

Where $d_s$ is the size of the light-emitting visual source; $\theta_s$ is the angle between a vector extending from the center of the light-emitting visual source along the normal horizontal axis and a vector extending from the center of the light-emitting visual source to the periphery of the reflective collector element; $d_{Ap}$ is the size of the eyebox perceived by user; and $\theta_{Ap}$ is one-half of the field of view perceived by the user.

This expression can be solved for $\theta_s$ as shown in Equation 6

$$\theta_s = \sin^{-1}((d_{Ap}/d_s) \cdot \sin(\theta_{Ap})) \qquad \text{Equation 6}$$

The arc tangent of angle $\theta_s$ can be solved to obtain an appropriate ratio of the size of half of the width of the reflective collector element (w/2) to the distance from the reflective collector element to the light-emitting visual source (x) as shown in Equation 7.

$$\theta_s = \tan^{-1}((w/2)/x) \qquad \text{Equation 7}$$

Therefore, by equilibrating the two expressions to one another and solving for w, Equation 8 provides:

$$w = 2 \cdot x \cdot \tan(\sin^{-1}((d_{Ap}/d_s) \cdot \sin(\theta_{Ap}))) \qquad \text{Equation 8}$$

For example, in one embodiment, an HMD comprises an eyebox with a size ($d_{Ap}$) of 8.5 mm; a light-emitting visual source in the form of a microdisplay with a size ($d_s$) of 8.0 mm; and a field of view ($2 \cdot \theta_{Ap}$) of 50°, where the reflective collector element is placed at a distance x of 28 mm away from the light-emitting visual source. Under these condi- tions, the reflective collector element has a width of about 28 mm to match the etendue at the eyebox.

In another embodiment, an HMD comprises an eyebox ($d_{Ap}$) of 12 mm; a light-emitting visual source in the form of a microdisplay with a size ($d_s$) of 7 mm; and a field of view ($2 \cdot \theta_{Ap}$) of 60°, where the reflective collector element is placed at a distance x of 20 mm away from the light-emitting visual source. Under these conditions, the reflective collec- tor element has a width of about 67 mm to match the etendue at the eyebox.

In another embodiment, an HMD comprises an eyebox ($d_{Ap}$) of 14 mm; a light-emitting visual source in the form of a microdisplay with a size ($d_s$) of 12 mm; and a field of view ($2 \cdot \theta_{Ap}$) of 45°, where the reflective collector element is placed at a distance x of 16 mm away from the light-emitting visual source. Under these conditions, the reflective collec- tor element has a width of about 16 mm to match the etendue at the eyebox.

In another embodiment, an HMD comprises an eyebox ($d_{Ap}$) of 9.0 mm; a light-emitting visual source in the form of a microdisplay with a size ($d_s$) of 8.0 mm; and a field of view ($2 \cdot \theta_{Ap}$) of 70°, where the reflective collector element is placed at a distance x of 25 mm away from the light-emitting visual source. Under these conditions, the reflective collec- tor element has a width of about 42 mm to match the etendue at the eyebox.

Preferably, the HMD comprises an eyebox with an aper- ture of about 3 mm to about 15 mm; and a visual image source with an aperture of about 3 mm to about 15 mm. For example, when the visual image source is a microdisplay, it is preferred that the microdisplay would have a width between about 3 mm and about 15 mm.

The size of the reflective collector element and the distance of the reflective collector element from the light- emitting visual source may depend on the application and the particular type of HMD and of the size of the field of view required in the application. These variations are well understood and can be implemented by a person of ordinary skill in the art. Preferably, the width of the reflective collector element is between about 10 mm and about 50 mm. Preferably, the reflective collector element is located at a distance between about 10 mm and about 70 mm from the light-emitting visual source. Preferably, the etendue perceived at the reflective collector element is within plus or minus about 30 percent of the etendue perceived at the eyebox; more preferably, the etendue perceived at the reflective collector element is within plus or minus about 10 percent of the etendue perceived at the eyebox. Preferably, the HMD will have a field of view between about 25 and about 70 degrees.

Figure 5:
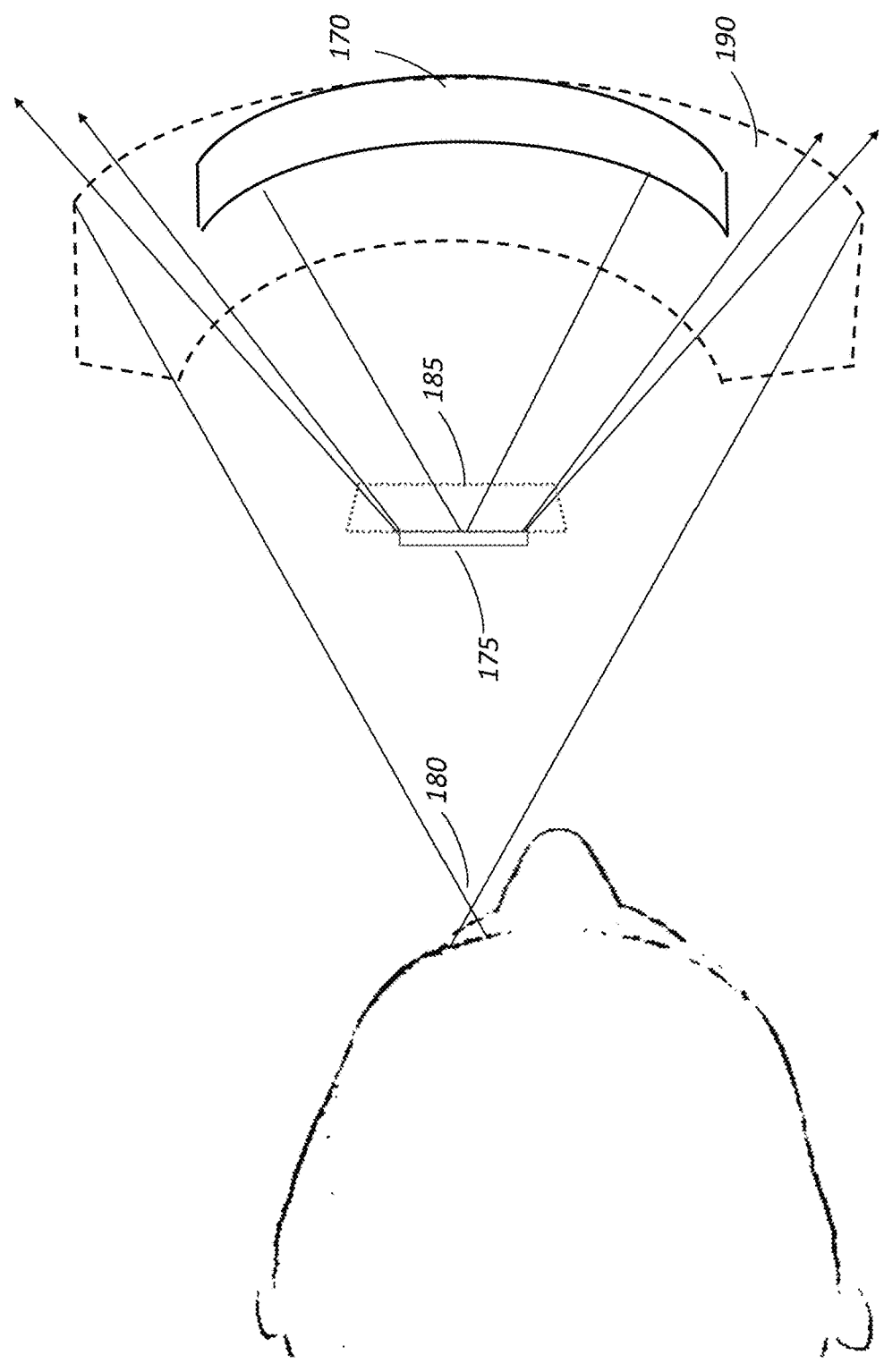
FIG. 5 is an illustration of the light distribution on an uncropped collector element.

Referring to FIG. 5, optionally, or in the alternative, the length of the reflective collector element, where "length" refers to the linear dimension that traverses roughly along a user's left eye to his right eye, or vice-versa, is cropped. In the embodiment of FIG. 5, the reflective collector element 170 is smaller than what is necessary to reflect all the light emitted from the light-emitting visual source 175. Specifically, the length is cropped such that the etendue at the reflective collector element 170 is about the same as the etendue observed art the eyebox 180. Visual image data is transmitted to the eyebox 180 using relay element 185 and combiner element 190. Preferably, the length of the reflective collector element is between about 10 mm and about 50 mm. Referring to FIGS. 3 and 5 together, optionally, both the length and the width of the reflective collector element are cropped, resulting in a discarding of light transmitted from the light-emitting visual source along both the length and the width. Whether the reflective collector element is cropped along the length, the width, or both, for the purposes of the invention, the etendue is measured using the analysis above, i.e., considering the width of the reflective collector element.

Figure 6:
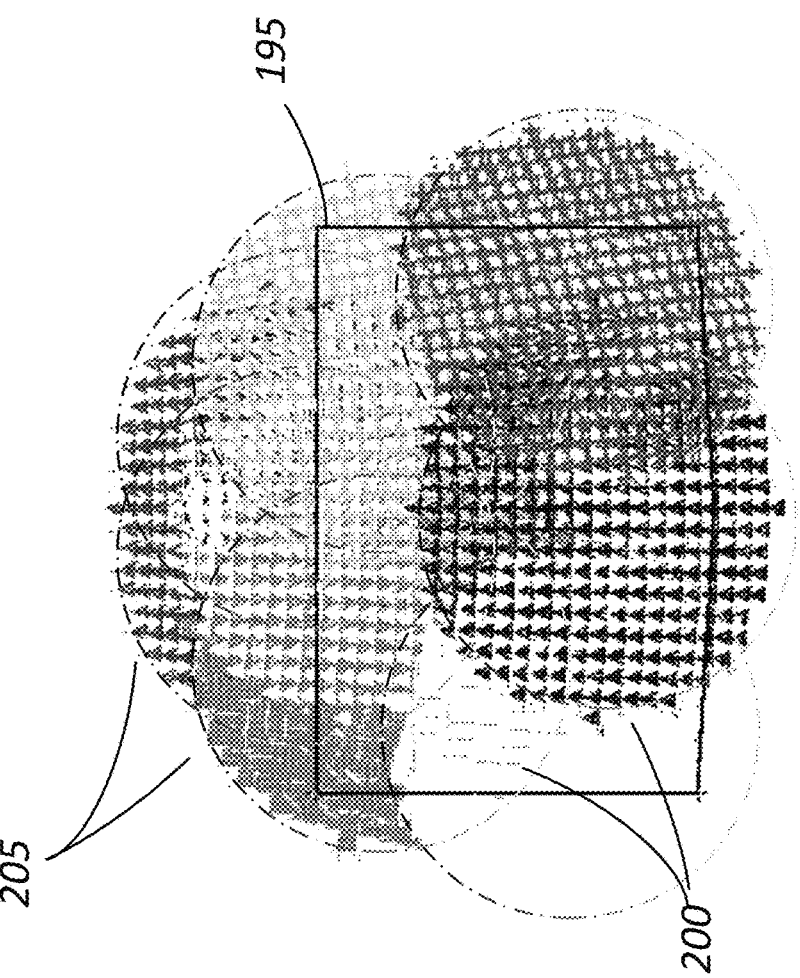
FIG. 6 is an illustration of the light distribution on a cropped collector element.

As shown in FIG. 6, as a consequence of reducing the size of the reflective collector element 195, only a portion of the luminous flux emitted from the visual is collected, represented by the luminous flux of area 200. The remaining luminous flux, represented by the luminous flux of area 205, is discarded. As a result, the perceived brightness at the eyebox, usually described in units of nits, is reduced. In a particular example, the reflective collector element 195 is cropped such that between about 30 and about 80 percent of the light emitted by the light-emitting visual source is discarded. There are several methods of estimating this loss of brightness that are available to the person of ordinary skill in the art, including by calculating the amount of luminous flux that is discarded, which directly corresponds to a reduction in brightness. In the case of reflective mirror elements of standard geometric shapes defined by first- or second-order polynomial equations, the reduction in brightness can be found through mathematical derivation. In the case of free form collector reflective element surfaces, the reduction in brightness can be estimated using numerical methods or statistical analyses, such as the Monte Carlo method.

For the purpose of the invention, the method of calculating the reduction in brightness at the eyebox is to treat the light-emitting visual source as a Lambertian emitter and, using a one-dimensional analysis, subtracting the integral of the Lambertian cosine function across the width of the reflective collector element from the integral of the Lambertian cosine function across the entire range of visible light emitted from the light-emitting visual source (i.e., $$I_0 \cdot \int_{-\frac{\pi}{2}}^{\frac{\pi}{2}} \cos(y)dy, \text{ or } I_0 \cdot 2).$$

Figure 7:
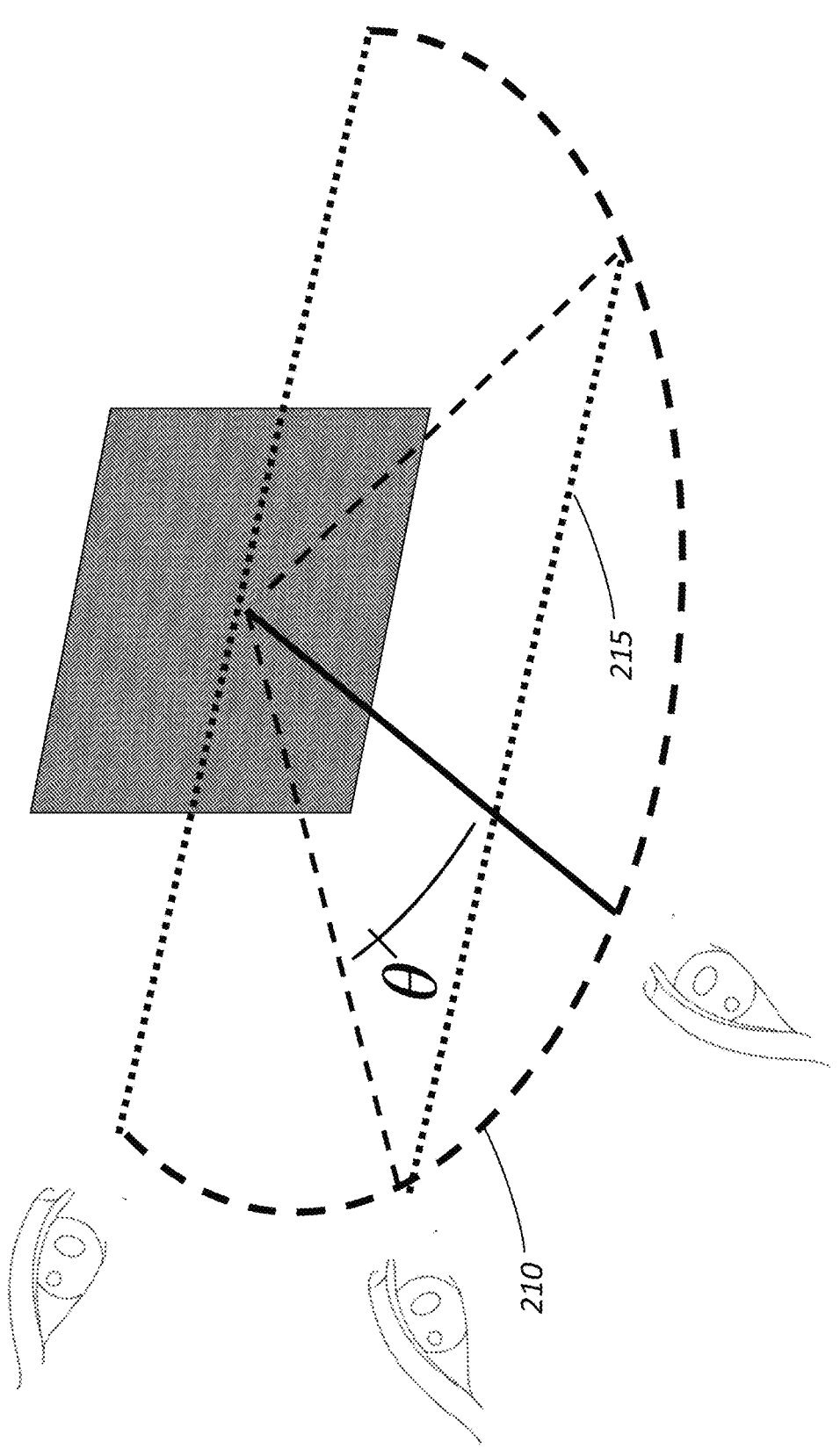
FIG. 7 is a diagram representing the loss of brightness according to Lambert's cosine law.

Referring to FIG. 7, this estimate takes the sum of luminous flux at every point around curve 210 and subtracts from it the luminous flux within the portion of the curve 210 inscribed by chord 215, which represents the width of the reflective collector element. Under this analysis, the amount of perceived brightness lost at the eyebox corresponds to L, where L represents the reduction in luminous flux per unit length as shown in Equation 9:

$$L = (I_0 \cdot 2) - \left(I_0 \cdot \int_{-\theta s}^{\theta s} \cos(y)dy\right) \qquad \text{Equation 9}$$

For example, in one embodiment, a reflective collector element has a width of 28 mm at a distance of 28 mm away from the light-emitting visual source, which results in an Lambertian angle as shown in Equation 10 below:

$$\theta s = \tan^{-1}((28/2)/28) = 27° \qquad \text{Equation 10}$$

L can be solved according to the expression in Equation 9 above as follows:

$$L = (I_0 \cdot 2) - \left(I_0 \cdot \int_{-27°}^{27°} \cos(y)dy\right) \qquad \text{Equation 9a}$$

$$L = I_0 \cdot \left(2 - \int_{-27°}^{27°} \cos(y)dy\right) \qquad \text{Equation 9b}$$

$$L = I_0 \cdot \left(2 - \int_{-27°}^{27°} \cos(y)dy\right) \qquad \text{Equation 9c}$$

$$L = I_0 \cdot (2 - 0.89) \qquad \text{Equation 9d}$$

$$L = 1.11 \cdot I_0 \qquad \text{Equation 9e}$$

This value can be used to estimate the brightness lost due to the cropping of the reflecting collector mirror compared to the total luminosity available at the light-emitting visual source. In this embodiment, this proportion (1.11/2) shows that, in a one-dimensional analysis, approximately 56% of the available luminous flux emitted by the light-emitting visual source was discarded by cropping the primary reflecting mirror, which would correspond to a related decrease in nits viewed at the eyebox.

In another embodiment, a reflective collector element has a width of 67 mm at a distance x of 20 mm away from the light-emitting visual source, which results in an Lambertian distribution angle as shown in Equation 11 below:

$$\theta s = \tan^{-1}((67/2)/20) = 59° \qquad \text{Equation 11}$$

Using the methodology described above, the luminous flux lost is $0.29 \cdot I_0$, which as a ratio is 14.5% and corresponds to a related decrease in brightness.

In another embodiment, a reflective collector element has a width of 16 mm at a distance x of 16 mm away from the light-emitting visual source, which results in an Lambertian angle as shown in Equation 12 below:

$$\theta s = \tan^{-1}((16/2)/16) = 27° \qquad \text{Equation 12}$$

Using the methodology described above, the brightness lost is $1.11 \cdot I_0$, which as a ratio is 56% and corresponds to a related decrease in brightness.

In another embodiment, a reflective collector element has a width of 42 mm at a distance x of 25 mm away from the light-emitting visual source, which results in an Lambertian angle as shown in Equation 13 below:

$$\theta s = \tan^{-1}((42/2)/25) = 40° \qquad \text{Equation 13}$$

Using the methodology described above, the brightness lost is $0.71 \cdot I_0$, which as a ratio is 14.5% and corresponds to a related decrease in brightness.

Preferably, the reflective collector element is cropped such that, using the estimation methodology above, between 35% and 70% of the brightness emitted by the microdisplay is discarded.

Terms of degree such as "about" as used in this disclosure are understood by those of ordinary skill in the art. In some particular examples, such terms of degree refer to values of up to 10% deviation from the values to which those terms of degree apply.

Having fully described at least one embodiment of the present invention, other equivalent or alternative designs according to the present invention will be apparent to those skilled in the art. While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A head mounted display device comprising:

a wearable, head mounted frame; and at least one near-to-eye optics housing connected to said frame and configured to be positioned at least partially in front of an eye of a user, said optics housing comprising:

a light-emitting visual source for projecting visual content, a plurality of reflective optical surfaces in optical communication with said light-emitting visual source, and an optical path defined by said plurality of reflective optical surfaces, said optical path extending from said light-emitting visual source to an eyebox of said optical path, wherein said plurality of reflective optical surfaces are configured to reflect light rays from a projection of said visual content between each one of said reflective optical surfaces in a predefined sequential order along said optical path and into said eyebox, and wherein said reflective optical surfaces are configured to cooperatively magnify said projection of said visual content, such that said projected visual content appears magnified when viewed at said eyebox;

wherein the first of said plurality of reflective optical surfaces in said predefined sequential order has a width smaller than that needed to capture all light emitted by the light-emitting visual source;

wherein said first of said plurality of reflective optical surfaces with said width discards light emitted by the light-emitting visual source such that the etendue product at the first of said plurality of reflective optical surfaces is about the same as the etendue product at said eyebox.

2. The head mounted display device of claim 1, wherein the first of said plurality of reflective optical surfaces has a width between about 10 mm and about 50 mm.

3. The head mounted display device of claim 2, wherein the first of said plurality of reflective optical surfaces is positioned at a distance between about 10 mm and about 70 mm away from the light-emitting visual source.

4. The head mounted display device of claim 3, wherein the light-emitting visual source has an aperture between about 3 mm and about 15 mm.

5. The head mounted display device of claim 4, wherein the eyebox has an aperture between about 3 mm and about 15 mm.

6. The head mounted display device of claim 5, wherein the first of said plurality of reflective optical surfaces is cropped such that between about 30 and about 80 percent of the light emitted by the light-emitting visual source is discarded.

7. The head mounted display device of claim 5, wherein the first of said plurality of reflective optical surfaces in said predefined sequential order has a length smaller than that needed to capture all light emitted by the light-emitting visual source.

8. The head mounted display device of claim 7, wherein the first of said plurality of reflective optical surfaces has a length between about 10 mm and about 50 mm.

9. The head mounted display device of claim 1, wherein the first of said plurality of reflective optical surfaces is cropped such that between about 30 and about 80 percent of the light emitted by the light-emitting visual source is discarded.

* * * * *